(12) United States Patent  (10) Patent No.: US 8,559,127 B2
Gage et al.  (45) Date of Patent: Oct. 15, 2013

(54) INTEGRATED HEAT ASSISTED MAGNETIC RECORDING HEAD WITH EXTENDED CAVITY VERTICAL CAVITY SURFACE EMITTING LASER DIODE

(75) Inventors: Edward Charles Gage, Lakeville, MN (US); Michael Lee Covault, Eden Prairie, MN (US); Roger Lee Hipwell, Jr., Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 364 days.

(21) Appl. No.: 12/975,438

(22) Filed: Dec. 22, 2010

(65) Prior Publication Data

US 2012/0163138 A1  Jun. 28, 2012

(51) Int. Cl.
*G11B 5/02* (2006.01)
*G11B 5/60* (2006.01)
*G11B 15/64* (2006.01)
*G11B 17/32* (2006.01)
*G11B 21/20* (2006.01)
*G11B 11/00* (2006.01)

(52) U.S. Cl.
USPC ................ 360/59; 360/234.3; 369/13.32

(58) Field of Classification Search
None
See application file for complete search history.

(56) References Cited

U.S. PATENT DOCUMENTS

| | | |
|---|---|---|
| 5,837,561 A | 11/1998 | Kish, Jr. et al. |
| 6,021,146 A | 2/2000 | Jiang et al. |
| 6,026,111 A | 2/2000 | Jiang et al. |
| 6,584,135 B2 | 6/2003 | Wipiejewski |
| 6,628,695 B1 | 9/2003 | Aldaz et al. |
| 6,963,530 B1 | 11/2005 | Thornton et al. |
| 6,975,661 B2 | 12/2005 | Skogman |
| 7,022,539 B2 | 4/2006 | Sato et al. |
| 7,133,230 B2 | 11/2006 | Saga et al. |
| 7,218,660 B2 | 5/2007 | Koelle et al. |
| 7,327,667 B2 | 2/2008 | Thornton et al. |
| 7,443,898 B2 | 10/2008 | Schmid et al. |
| 7,609,480 B2 | 10/2009 | Shukh et al. |
| 8,259,539 B1* | 9/2012 | Hu et al. ............... 369/13.33 |
| 2008/0002298 A1* | 1/2008 | Sluzewski ............... 360/234.4 |
| 2009/0032831 A1* | 2/2009 | Akiyama et al. ........... 257/98 |
| 2010/0214685 A1 | 8/2010 | Seigler et al. |
| 2011/0243176 A1* | 10/2011 | Mooney et al. ......... 372/50.124 |

* cited by examiner

*Primary Examiner* — Regina N Holder
(74) *Attorney, Agent, or Firm* — Hollingsworth Davis, LLC (57) ABSTRACT

An apparatus includes a transducer assembly including a waveguide and a grating structured to couple electromagnetic radiation into the waveguide; and a body including an extended cavity vertical cavity surface emitting laser diode, and having an air bearing surface, wherein the transducer assembly is positioned adjacent to the body and the laser diode directs electromagnetic radiation onto the grating. A method of making the apparatus is also included.

20 Claims, 10 Drawing Sheets

INTEGRATED HEAT ASSISTED MAGNETIC RECORDING HEAD WITH EXTENDED CAVITY VERTICAL CAVITY SURFACE EMITTING LASER DIODE

BACKGROUND

Heat assisted magnetic recording (HAMR) generally refers to the concept of locally heating a recording media to reduce the coercivity of the media so that an applied magnetic writing field can more easily direct the magnetization of the media during the temporary magnetic softening of the media caused by the heat source. A tightly confined, high power laser light spot is used to heat a portion of the recording media to substantially reduce the coercivity of the heated portion. Then the heated portion is subjected to a magnetic field that sets the direction of magnetization of the heated portion. In this manner the coercivity of the media at ambient temperature can be much higher than the coercivity during recording, thereby enabling stability of the recorded bits at much higher storage densities and with much smaller bit cells.

One approach for directing light onto recording media uses a planar solid immersion mirror (PSIM), or lens, fabricated on a planar waveguide; and a near-field transducer (NFT), in the form of an isolated metallic nanostructure, placed near the PSIM focus. The near-field transducer is designed to reach a local surface plasmon (LSP) condition at a designated light wavelength. At LSP, a high field surrounding the near-field transducer appears, due to collective oscillation of electrons in the metal. Part of the field will tunnel into an adjacent media and get absorbed, raising the temperature of the media locally for recording.

High levels of optical radiation are needed in the HAMR head in order to provide rapid heating of magnetic media. A light source that produces such levels of optical radiation in combination with a light delivery system is desired.

SUMMARY

In one aspect, the invention provides an apparatus including a transducer assembly including a waveguide and a grating structured to couple electromagnetic radiation into the waveguide; and a body including an air bearing surface and an extended cavity vertical cavity surface emitting laser diode, wherein the transducer assembly is positioned adjacent to the body and the laser diode directs electromagnetic radiation onto the grating.

DETAILED DESCRIPTION OF THE INVENTION

Figure 1:
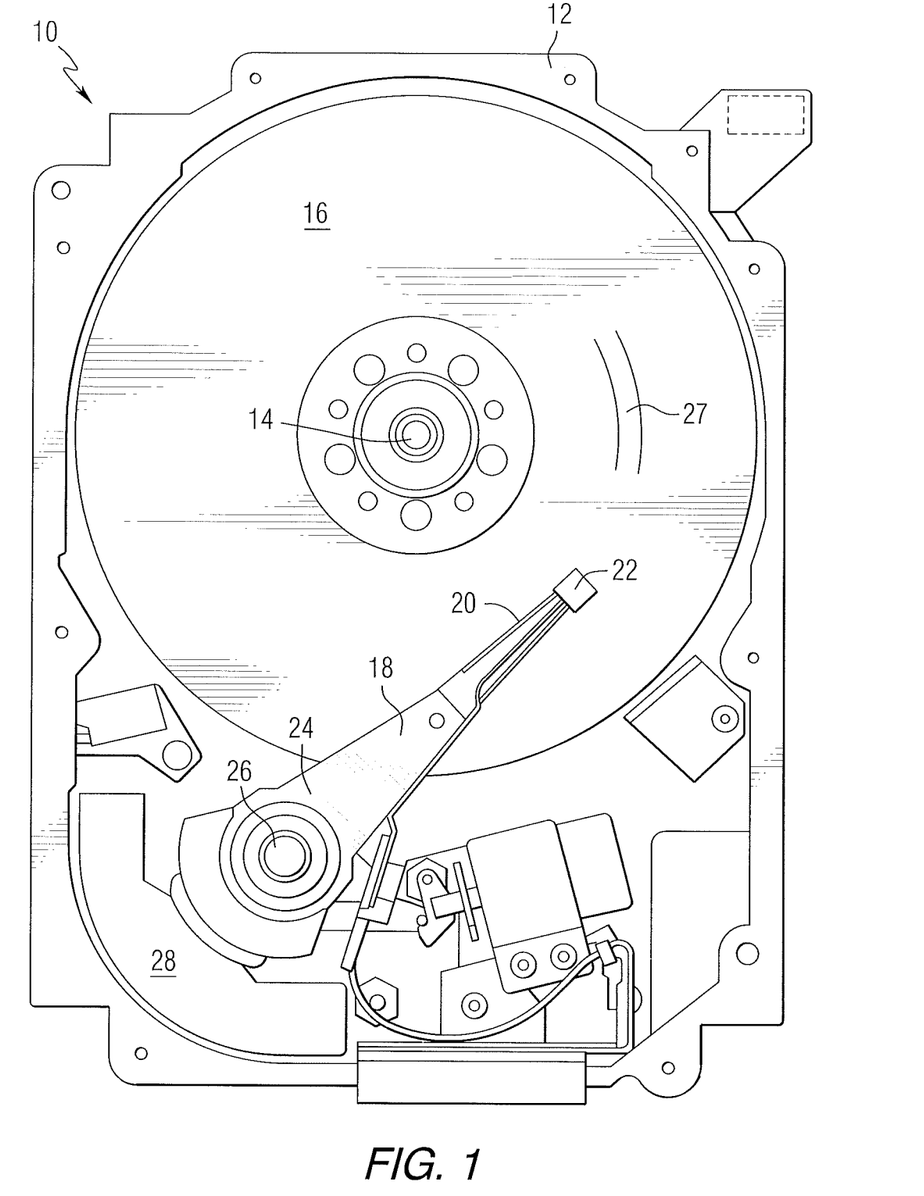
FIG. 1 is a pictorial representation of a data storage device in the form of a disc drive that can include a recording head in accordance with an aspect of this invention.

FIG. 1 is a pictorial representation of a data storage device in the form of a disc drive 10 that can utilize a recording head constructed in accordance with an aspect of the invention. The disc drive 10 includes a housing 12 (with the upper portion removed and the lower portion visible in this view) sized and configured to contain the various components of the disc drive. The disc drive 10 includes a spindle motor 14 for rotating at least one magnetic recording media 16 within the housing. At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired track 27 of the disc 16. The actuator motor 28 is regulated by a controller, which is not shown in this view and is well-known in the art.

Figure 2:
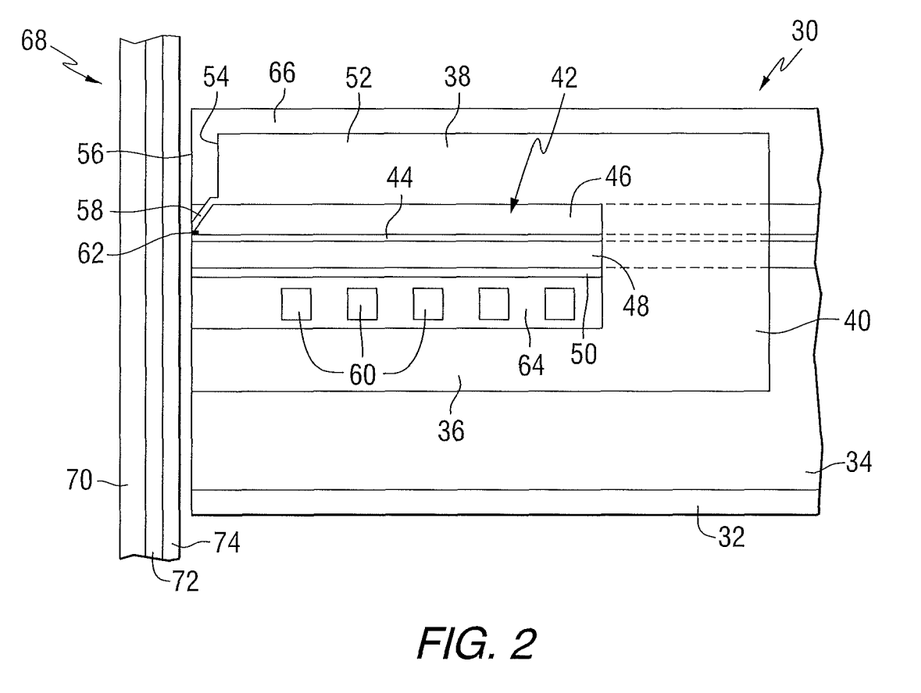
FIG. 2 is a cross-sectional view of a portion of a recording head.

FIG. 2 is a cross-sectional view of an example of a recording head for use in heat assisted magnetic recording. The recording head 30 includes a substrate 32, a base coat 34 on the substrate, a bottom pole 36 on the base coat, and a top pole 38 that is magnetically coupled to the bottom pole through a yoke or pedestal 40. A waveguide 42 is positioned between the top and bottom poles. The waveguide includes a core layer 44 and cladding layers 46 and 48 on opposite sides of the core layer. A mirror 50 is positioned adjacent to one of the cladding layers. The top pole is a two-piece pole that includes a first portion, or pole body 52, having a first end 54 that is spaced from the air bearing surface 56, and a second portion, or sloped pole piece 58, extending from the first portion and tilted in a direction toward the bottom pole. The second portion is structured to include an end adjacent to the air bearing surface 56 of the recording head, with the end being closer to the waveguide than the first portion of the top pole. A planar coil 60 also extends between the top and bottom poles and around the pedestal. A near-field transducer (NFT) 62 is positioned in the cladding layer 46 adjacent to the air bearing surface. An insulating material 64 separates the coil turns. Another layer of insulating material 66 is positioned adjacent to the top pole.

A recording medium 68 is positioned adjacent to or under the recording head 30. The recording medium 68 in this example includes a substrate 70, which may be made of any suitable material such as ceramic glass or amorphous glass. A soft magnetic underlayer 72 is deposited on the substrate 70. The soft magnetic underlayer 72 may be made of any suitable material such as, for example, alloys or multilayers of Co, Fe, Ni, Pd, Pt or Ru. A hard magnetic recording layer 74 is deposited on the soft underlayer 72, with the perpendicular oriented magnetic domains contained in the hard recording layer 74. Suitable hard magnetic materials for the hard magnetic recording layer 74 may include at least one material selected from, for example, FePt or CoCrPt alloys having a relatively high anisotropy at ambient temperature.

The optical waveguide acts in association with a source of electromagnetic radiation which transmits electromagnetic radiation to the waveguide. For the purposes of this description the electromagnetic radiation is referred to as light. The light is coupled to the optical waveguide by a coupling means such as a grating. The light propagates through the optical waveguide toward the recording medium to heat a localized area of the recording layer. In one aspect of this invention, the light source is a vertical cavity surface emitting laser diode. Although the recording head may be a perpendicular magnetic recording head and the storage medium may be a perpendicular magnetic recording medium, it will be appreciated that the invention may also be used in conjunction with other types of recording heads and/or recording mediums where it may be desirable to employ heat assisted recording.

Figure 3:
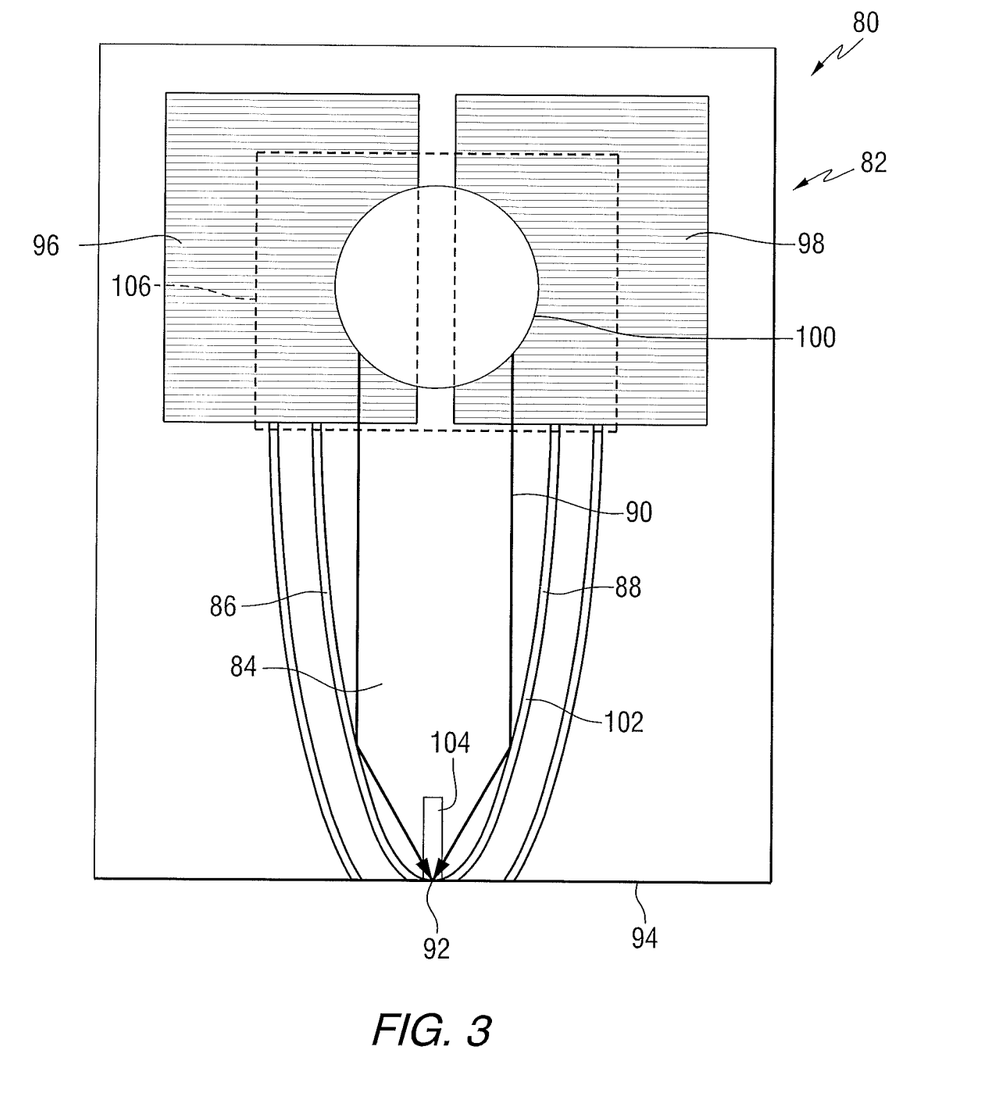
FIG. 3 is an elevation view of a waveguide that may be used in the recording head of FIG. 2.

FIG. 3 is an elevation view of a waveguide 80 in a recording head 82. The waveguide includes a planar core layer 84 having generally parabolic edges 86 and 88, shaped to reflect light 90 to a focal point 92 at or near the air bearing surface 94. Gratings 96 and 98 are positioned on the core layer and used to couple light into the core layer. The gratings can be offset with respect to each other so that the electric component of the light in the two sides of the waveguide adds at the focal point. The light that impinges the gratings is shown as a spot 100. A reflective coating 102, which can be Au, is provided along the edges of the core layer. This arrangement forms a solid immersion mirror. A return pole 104 is positioned adjacent to the air bearing surface. A laser can be positioned at the location shown by rectangle 106. In one embodiment, the light impinges the gratings from a direction that is substantially perpendicular to the plane of the waveguide. To direct the light toward the air bearing surface, one of several methods for coupling a normal-incidence laser source would need to be employed. For example, a normal incident grating coupler such as an angled blazed grating can be used. Alternative coupling arrangements may include a slanted reflection mirror to direct the light in a desired direction.

Vertical cavity surface emitting lasers (VCSELs) are a type of semiconductor laser in which light is emitted out of a typically circular aperture at either the top or bottom of the device instead of the side as is done with edge-emitting lasers. The geometry of VCSELs reduces manufacturing costs, increases yield and has a number of other advantages including narrower line width, no astigmatism, reduced sensitivity to feedback noise, etc. Unfortunately, because the laser cavity of a VCSEL is typically much shorter than in edge-emitting lasers, it is difficult to engineer a device with high output power that has a single spatial mode. As a result, it is difficult to implement VCSELs as the light source in applications requiring a coherent, high power laser light source, such as heat assisted magnetic recording (HAMR).

External cavity vertical cavity laser diodes have been proposed as a light source for HAMR. Because of their size of about 0.5 mm to about 1 mm in length, it is difficult to incorporate VCSELs into existing HAMR slider designs. In order to generate high power single mode light, in one aspect, the invention integrates an external cavity VCSEL into the slider body.

Figure 4:
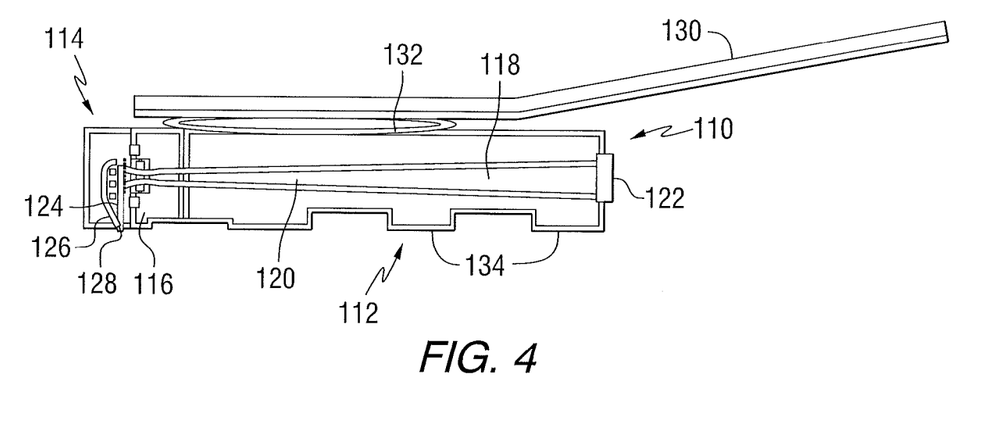
FIG. 4 is a side view of a recording head and a portion of an actuator arm.

FIG. 4 is a side view of a slider 110 that includes an extended cavity vertical cavity surface emitting laser diode 112 and a transducer portion 114. The laser diode includes an active portion 116 including known active elements of a VCSEL that are used to produce light, and an extended cavity portion 118. The extended cavity portion includes a transparent section 120 and a mirror 122. The active portion is located at the end of the VCSEL that is adjacent to the transducer portion.

The transducer portion includes a waveguide 124 configured to receive light from the laser and a magnetic write pole in a layer 126 adjacent to the waveguide layer. A grating coupler, as shown in FIG. 3, is included to couple light from the laser to the waveguide. The waveguide transmits the light to an air bearing surface 128 of the recording head. Light emitted from the air bearing surface is used to heat a portion of an adjacent recording medium, not shown in this view. The transducer portion can include other elements found in known recording heads, such as a coil for producing a magnetic field in the write pole, a read sensor, and associated components. The slider is coupled to an actuating arm 130 by a gimbal assembly 132. When used in a data storage device, the axis of the laser cavity would be positioned by the arm and gimbal to be substantially parallel to the surface of a recording medium. Projections 134 are located on the air bearing surface of the read write head. The slider material chosen must meet the air bearing and mechanical robustness capabilities. As shown in FIG. 4, the slider includes a HAMR transducer and a body that includes a VCSEL. These structures can be surrounded by alumina.

The transducer portion, also referred to as the head magnetics, can be fabricated on a first substrate and the laser can be fabricated on a second substrate. To form the slider, the laser is fixed to the transducer portion, using for example, solder, frit, epoxy, metal-metal diffusion bonding, direct bonding, plasma enhanced direct bonding, etc. Alternatively, the read/write transducer and optical integration components can be fabricated directly on a substrate with the transferred VCSEL. This allows optimal integration and alignment of the laser and optical components.

In the embodiment of FIG. 4, the laser diode is integral to the slider body. This allows a VCSEL to be used in a relatively small slider. The laser is coupled to the transducer assembly and the light beam is directly coupled into the waveguide without the need for external optical configurations. Once the light beam is coupled into the waveguide, the light propagates through the waveguide toward a truncated end of the waveguide that is formed adjacent the air bearing surface (ABS) of the recording head. Light exits the end of the waveguide and heats a portion of the media, as the media moves relative to the recording head. A near-field transducer can be positioned in or adjacent to the waveguide to further concentrate the light in the vicinity of the air bearing surface, as shown in FIG. 2.

This highly integrated HAMR light delivery design would allow for the lowest cost and highest mechanical performance because it does not require any special opto-mechanical assembly or add any new size to the slider. As illustrated in the drawings, the recording head includes a structure for heating the magnetic recording media proximate to where the write pole applies the magnetic write field to the recording media.

In another aspect, the invention encompasses a data storage device that includes the transducer assembly described above. The data storage device includes a storage medium, a recording head, and an arm for positioning the recording head adjacent to the storage medium, wherein the recording head includes a transducer assembly including a waveguide, a grating structured to couple electromagnetic radiation into the waveguide, and an air bearing surface; and a body including an extended cavity vertical cavity surface emitting laser diode, wherein the transducer assembly is bonded to the body and the laser diode directs electromagnetic radiation onto the grating.

In another aspect, the invention provides a method for fabricating a highly integrated HAMR head using wafer bonding of a VCSEL wafer and a transparent material for the slider body and the extended laser cavity.

Figure 5:
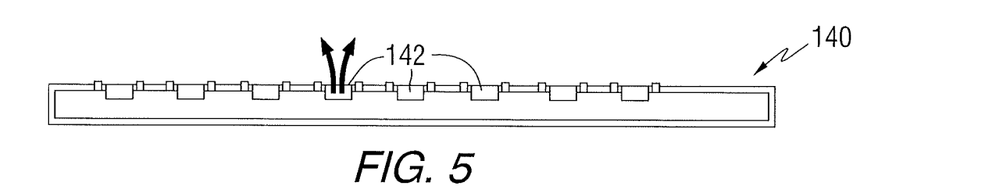
FIG. 5 is a schematic representation of a wafer including a plurality of laser diode active regions.

FIG. 5 is a schematic representation of a portion of a wafer 140 including a plurality of VCSEL diode active elements 142. Each individual element emits light orthogonal to the surface of the wafer. If the current is increased the laser power will increase. Unfortunately the spatial mode profile will change to multimode because of the short cavity.

VCSELs are typically produced on 4 or 6 inch GaAs or InGaP wafers. Thicknesses range from about 100 to about 500 microns. Mirrors, a gain region, and electrical contacts are fabricated using known deposition and processing techniques. An asymmetry such as strain or shape is used to control the polarization of the laser emission. The laser emission wavelengths could be in the visible range (e.g., 650 nm), or the near infrared 780-990 nm, or infrared 1300-1570 nm spectra.

Figure 6:
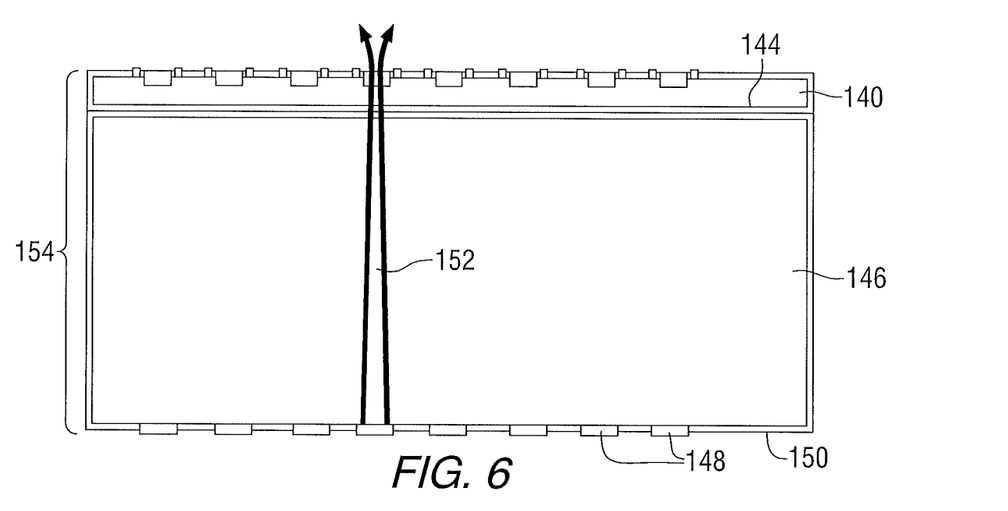
FIG. 6 is a schematic representation of a wafer including a plurality of extended cavity laser diodes.

FIG. 6 is a schematic representation of the wafer 140 of FIG. 5 adjacent to a first surface 144 of a substrate 146, also referred to as a transparent wafer. A plurality of mirrors 148 are positioned on a second surface 150 of the substrate. The substrate and mirrors form a plurality of extended cavities 152, which in combination with the laser diode active regions 142, form a plurality of extended cavity laser diodes 154.

FIG. 6 shows a wafer of external cavity vertical cavity lasers. A substrate of an optically transparent material is bonded to the laser wafer. Material options for the transparent wafer include silicon, glass, sapphire, or SiC depending on the laser wavelength. Electrical contacts could be patterned on the back side of the laser or transparent wafer. Mirror regions can be deposited on the back of the transparent wafer. The mirrors could be flat or etched or deposited to form a curved surface. The curved mirror would further enhance single mode behavior of the VCSELs. The transparent wafer could be from about 500 to about 1500 microns thick. Wafer bonding techniques include solder, frit, epoxy, metal-metal diffusion bonding, direct bonding, plasma enhanced direct bonding, etc. The extended cavity allows the laser to maintain single spatial mode operation up to powers from about 50 mW to about 100 mW. Current HAMR recording requires 20 mW to 70 mW. Thus the extended cavity can provide the power required for HAMR recording.

Figure 7:
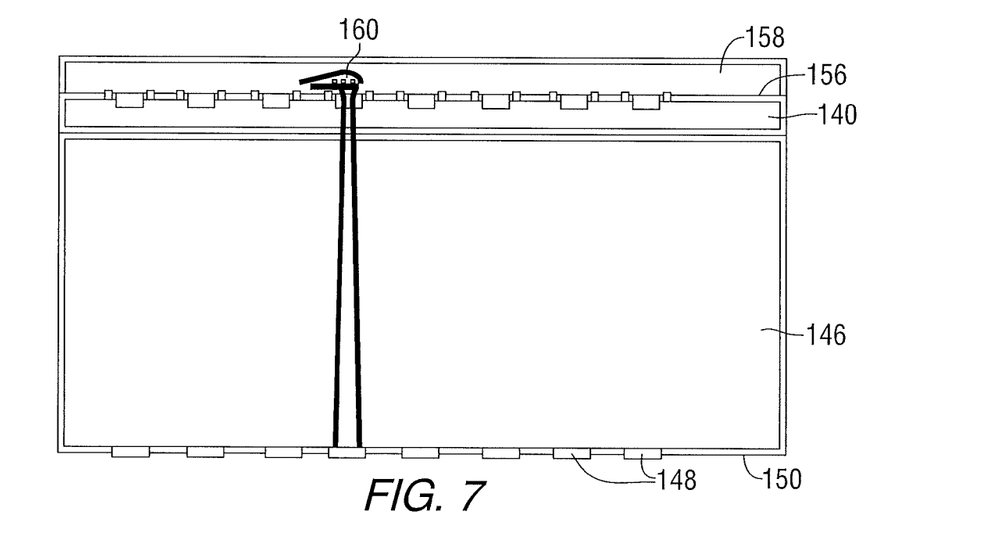
FIG. 7 is a schematic representation of a wafer including a plurality of extended cavity laser diodes adjacent to a wafer including a plurality of transducer assemblies.

The bonded laser wafer and transparent wafer would then form the substrate for deposition of known HAMR head recording elements to form the head magnetics. A basecoat 156 such as alumina or SiON or similar transparent material would be applied to the surface of the laser wafer. FIG. 7 is a schematic representation of the wafer 140 and substrate 146 including a plurality of extended cavity laser diodes adjacent to a wafer 158 including a plurality of transducer assemblies 160. The basecoat 156 serves as a mechanical and electrical insulator as well as providing desired thermomechanical read/write performance. It is typical in the range of several microns.

FIG. 7 shows a wafer of extended cavity VCSEL lasers with the HAMR optical and magnetic writer elements fabricated on the basecoat. Grating couplers, such as that shown in FIG. 3 can be used to couple the VCSEL emission into a waveguide in the plane of the wafer deposition. The grating can be blazed to couple the light towards the planar solid immersion mirror and the near-field transducer. The light from the VCSEL is focused and confined with high efficiency. The head magnetics portion may include known components including a magnetic write pole, a coil, and magnetic yoke structures. A magnetic reader such as a TGMR structure can also be included. The magnetic and optical elements can be fabricated via known deposition methods.

The wafer of HAMR sliders shown in FIG. 7 would then be sliced into bars using known methods. The bars would then be stacked and the air bearing and additional electrical connections would be formed using known processing techniques. The bars would then be sliced into sliders and mounted onto a gimbal assembly to form a finished head gimbal assembly. FIG. 4 shows a finished head gimbal assembly.

Previously know sliders include a body portion of AlTiC which combines hardness, good cutting properties, and is well matched for the thermal expansion of the other materials used in the head fabrication. Because of the thermal expansion issues it may be desirable to include thermal actuators (heaters) in the region of the reader and the near-field transducer. Then the spacing can be accurately controlled by setting the power to the thermal actuators.

Figure 8:
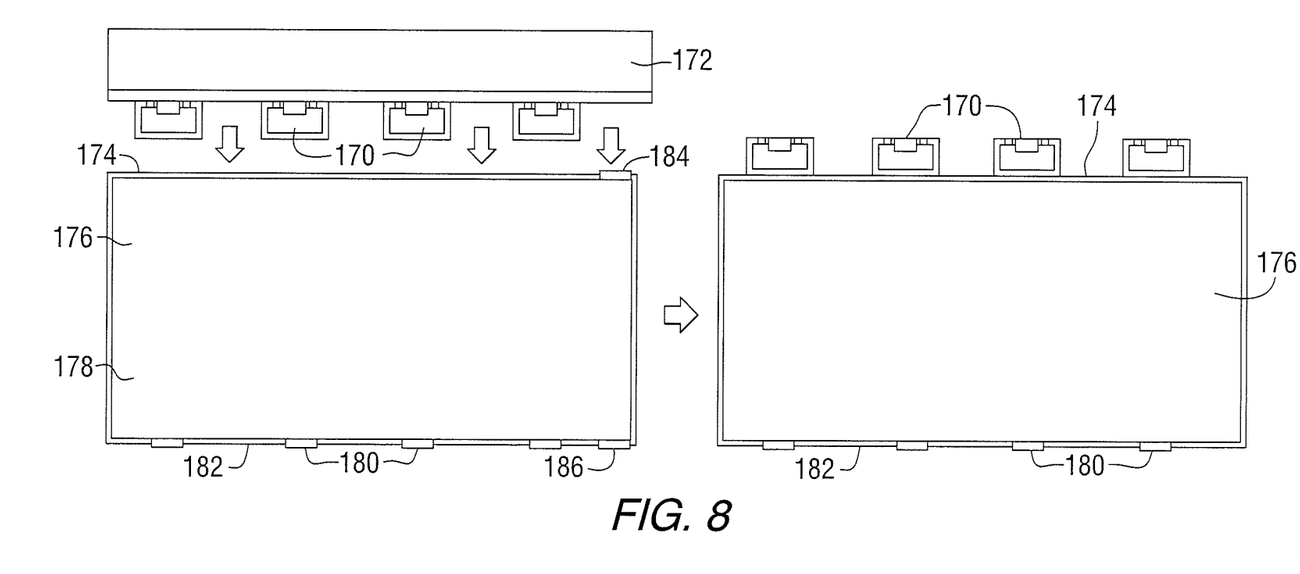
FIG. 8 is a schematic representation of a fabrication process used to make laser diodes that can be used in the recording head of FIG. 4.

An alternative to full wafer-to-wafer bonding of the laser active regions (GaAs wafer) to the transparent cavity/mirror wafer is to assemble arrays of separate laser active regions (i.e. with no extra field area). FIG. 8 is a schematic representation of a fabrication process using batch transfer of GaAs layers, which can be used to make laser diodes for use in the recording heads. A plurality of laser active regions 170 are formed on a transfer substrate 172. Then a batch transfer of laser components to a first surface 174 of a target substrate 176 is performed. The target substrate includes a transparent material 178 and a plurality of mirrors 180 formed on a second surface 182. The laser active regions could be bonded to a blank substrate or aligned with the front or back of target substrate. Alignment features 184 and 186 can be included on the target substrate to assist in the alignment.

Figure 9:
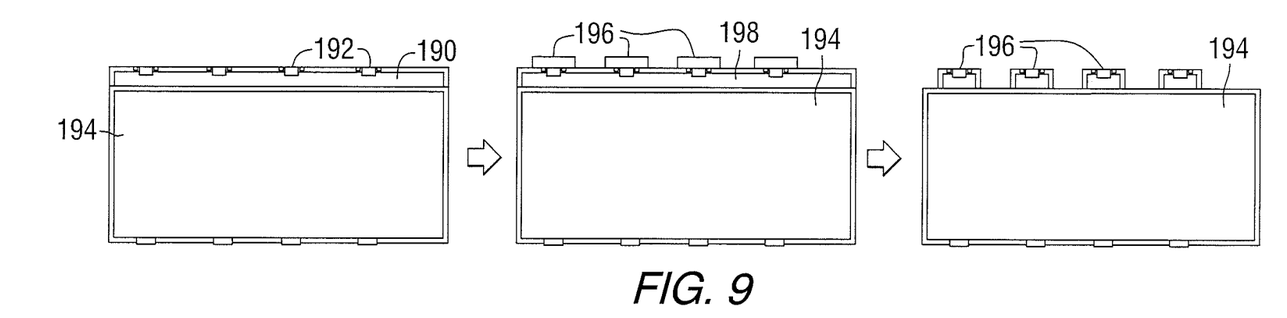
FIG. 9 is a schematic representation of another fabrication process used to make laser diodes that can be used in the recording head of FIG. 4.

Another alternative is to bond a wafer 190 of laser active regions 192 to a substrate 194, as shown in FIG. 9. Then a non-critical etch or milling of the non-active areas of the wafer is performed to remove the non-active areas. An etch stop 196 or resist can be deposited over the laser active regions, and the non-active regions 198 can be removed. FIG. 9 shows a full wafer or array bonding to target substrate followed by subsequent etch or mill of fill material to minimize thermal expansion effects and/or to allow for through-substrate alignment on subsequent steps.

The process illustrated in FIG. 9 allows for flexibility in size of the read/write head wafer fabrication versus the laser active layer wafer size and removes the constraint of matching laser-to-laser spacing to match head-to-head spacing on wafer layout. This could offer densification to the laser fabrication. It also allows for visual inspection through the substrate for front to back alignment on critical photo steps. This is particularly important if a non-flat mirror is used. In addition, there would be less material interaction on thermal expansion mismatches. It also allows for populating the wafer with known good die lasers. If the transducer wafer was transferred, then the target substrate with the laser would need to be filled and planarized. However, in another embodiment, the transducer elements would be fabricated on top of the slider body/VCSEL wafers. This inherently involves depositing material in the gaps.

Figure 10:
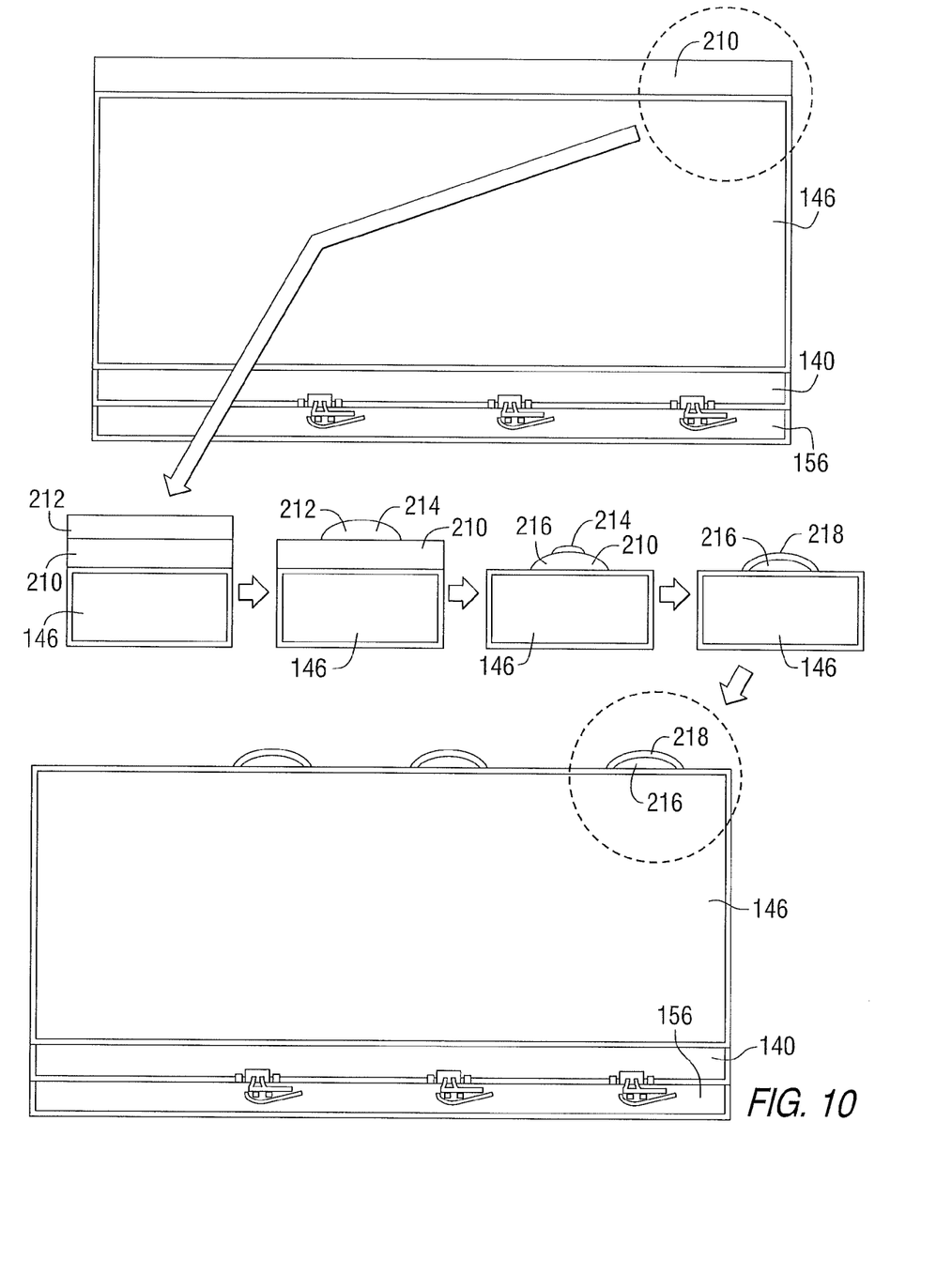
FIG. 10 is a schematic representation of a fabrication process used to make curved mirrors for laser diodes.

In another embodiment, if a non-planar reflecting mirror is desired on the back side of the VCSEL extended cavity wafer, then a number of fabrication methods can be employed to achieve a desired mirror shape. One embodiment includes gray-scale lithography or photoresist reflow techniques that are known in the field of batch lens manufacturing. This process is shown in FIG. 10. A transparent mold layer 210 is deposited on a back surface of the transparent substrate 146. The transparent mold layer can be, for example, $SiO_2$, $SiN_x$, $SiON_x$, or $Al_2O_3$. Then a resist layer 212 is deposited on the mold layer. The resist layer is patterned, using for example gray-scale lithography or resist reflow, to leave isolate resist islands 214. Alternatively, the mold layer need not be used, and resist can be patterned directly on the transparent substrate. Then the mold layer or substrate is etched to form a curved surface 216. Next a mirror layer 218 is deposited on the curved surface.

As shown in FIG. 10, a resist pattern has a profile that will create a rounded etch profile after the resist is fully consumed. This pattern can be formed by those skilled in the art of gray-scale lithography or resist reflow. The etched transparent layer (or substrate) can be used to deposit the patterned metal mirror layer.

If alignment marks are patterned onto the front side of the transparent extended cavity wafer and/or if some of the GaAs material is etched away from the non-critical areas, then through-wafer optical alignment can be used for the photolithography alignment of the back side features. This is particularly important for non-planar reflecting mirrors to center the mirror on the apertures for a given stepper field. Alternatively, marks could be placed on the back side and a reference mark could be patterned on the front side of the wafer.

Figure 11:
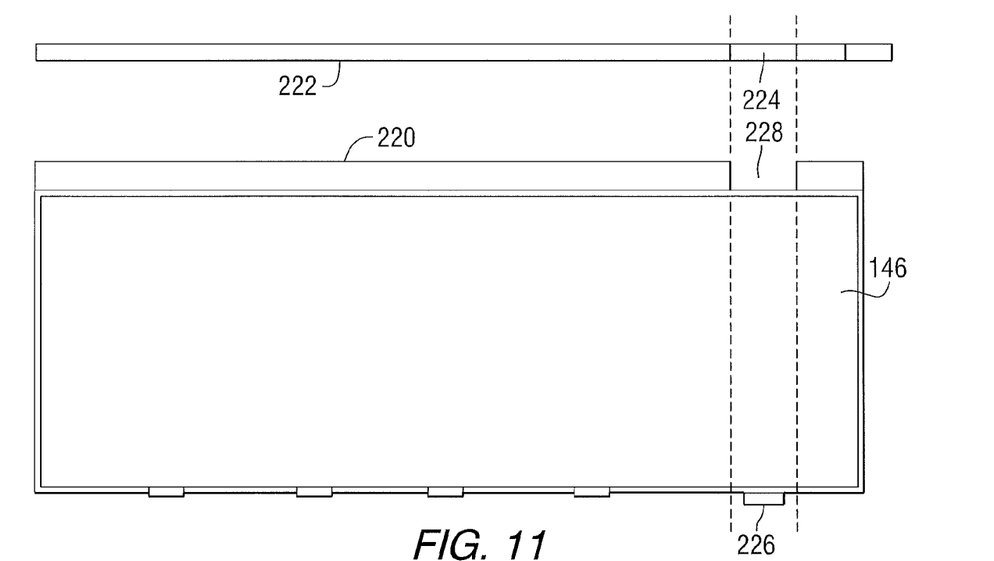
FIG. 11 is a schematic representation of an alignment process that can be used in the fabrication of laser diodes.

FIG. 11 illustrates the concept for through-wafer alignment to back side mirror to establish a front side alignment mark. A resist 220 is deposited on the transparent substrate 146. A photolithography mask 222, which could be opaque chrome, is positioned over the resist. The mask includes an opening 224 that is aligned with an alignment mark 226 on the back side of the substrate. Then a front side alignment mark 228 can be created, using for example a lift-off or etch mask technique, for precise laser bonding alignment or etch alignment.

Figure 12:
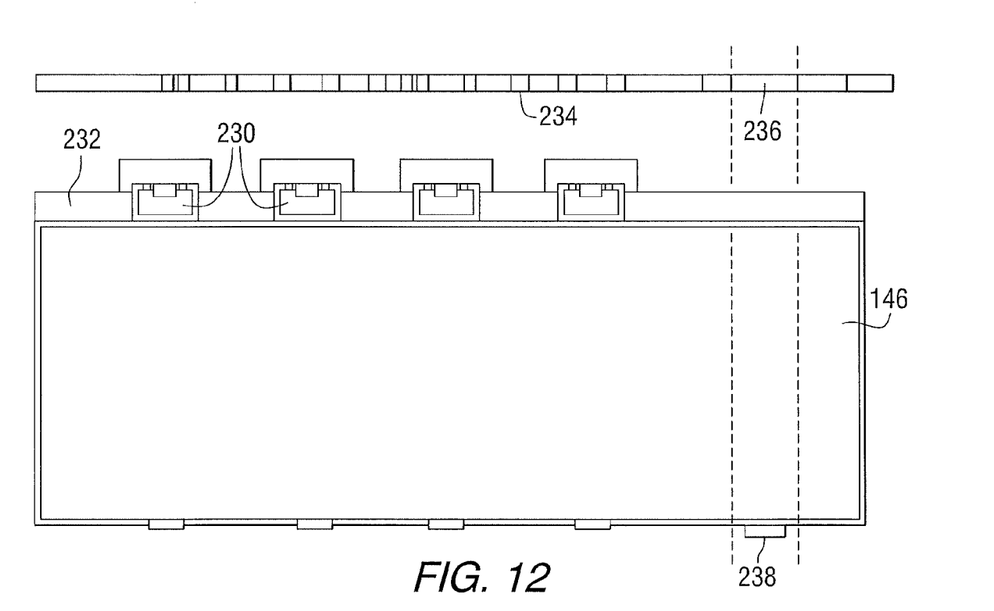
FIG. 12 is a schematic representation of an alignment process that can be used in the fabrication of laser diodes.

FIG. 12 illustrates another example of using through-wafer alignment for a critical alignment or etch. A plurality of laser active regions 230 are positioned on a transparent substrate 146 and covered by a resist 232. A photolithography mask 234, which could be opaque chrome, is positioned over the resist. The mask includes an opening 236 that is aligned with an alignment mark 238 on the back side of the substrate.

Several options could be utilized to bond the GaAs laser wafer to the transparent extended cavity wafer. Wafer bonding techniques include, but are not limited to: solder bonding, direct metal bonding, glass frit bonding, epoxy or adhesive bonding, metal-metal diffusion bonding, and direct bonding (with or without plasma activation).

For solder bonding using for example AuSn, CuSnAg, SnAg, etc. a non-transparent metal is patterned in light cavity path. One could also use the physics of solder-self-alignment to establish a precise alignment capability. Direct metal bonding can be, for example Au—Au, CuCu, or plasma-activated metal bonding, in which a non-transparent metal is patterned in light cavity path.

Direct bonding (with or without plasma activation) could be used directly with the GaAs and transparent substrate material or could be combined with intermediate bonding layers to enhance the bonding. The bonding layers could be either transparent bonding layers (e.g. $SiO_2$) or patterned layers that do not need to be transparent. Several surface treatment and activation methods known in the bonding field allow for room temperature or elevated temperature of such surfaces. Treatments include plasma treatment/activation, surface planarization to a desired intermolecular roughness, and chemical bonding treatment.

Figure 13:
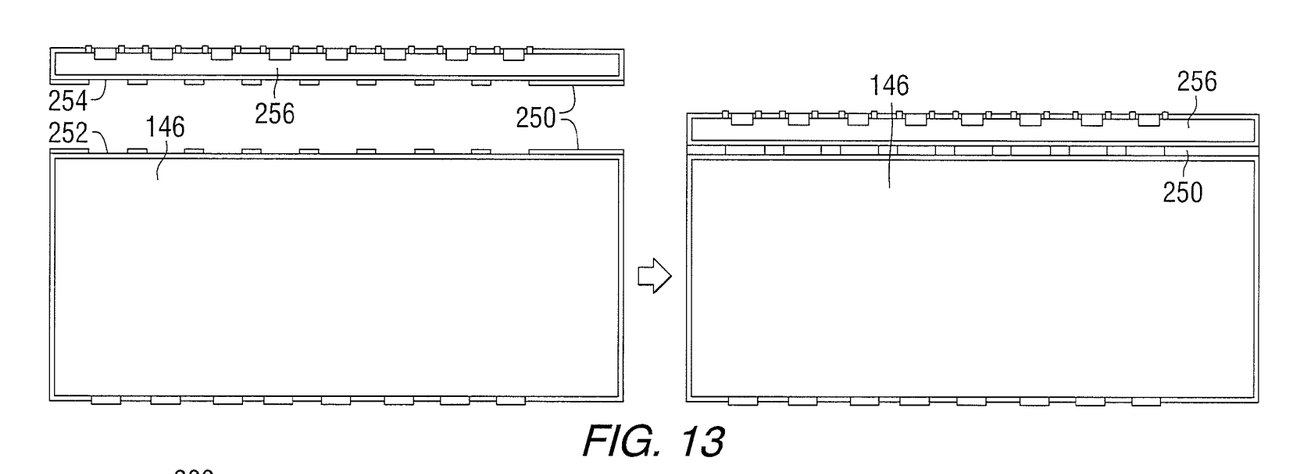
FIG. 13 is a schematic representation of a bonding process that can be used in the fabrication of laser diodes.

FIG. 13 shows an example of bonding using a patterned bonding material (e.g. Cu—Cu, AuSn, etc.). A patterned bonding material 250 is deposited on a surface 252 of the transparent substrate 146, and on a surface 254 of the laser wafer 256. Then the substrate and wafer are joined by the bonding material between the wafer and substrate. This type of bonding is used with a non-optically transparent bonding material.

Figure 14:
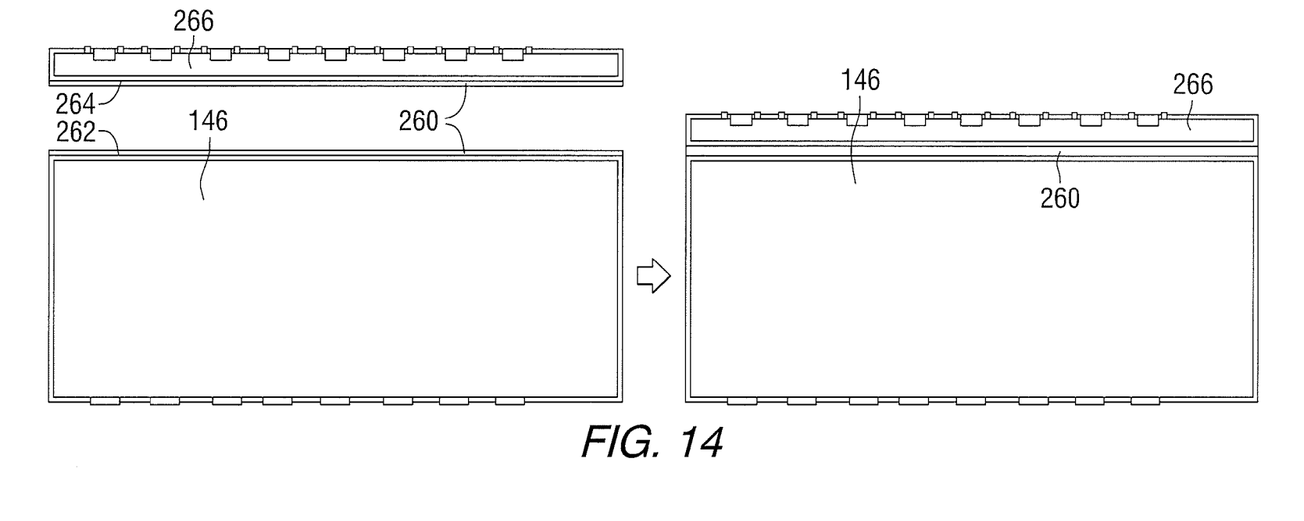
FIG. 14 is a schematic representation of a bonding process that can be used in the fabrication of laser diodes.

FIG. 14 shows an example of bonding using an unpatterned bonding layer (e.g. surface activated $SiO_2$). A continuous layer of bonding material 260 is deposited on a surface 262 of the transparent substrate 146, and on a surface 264 of the laser wafer 266. Then the substrate and wafer are joined by the bonding material between the wafer and substrate.

Figure 15:
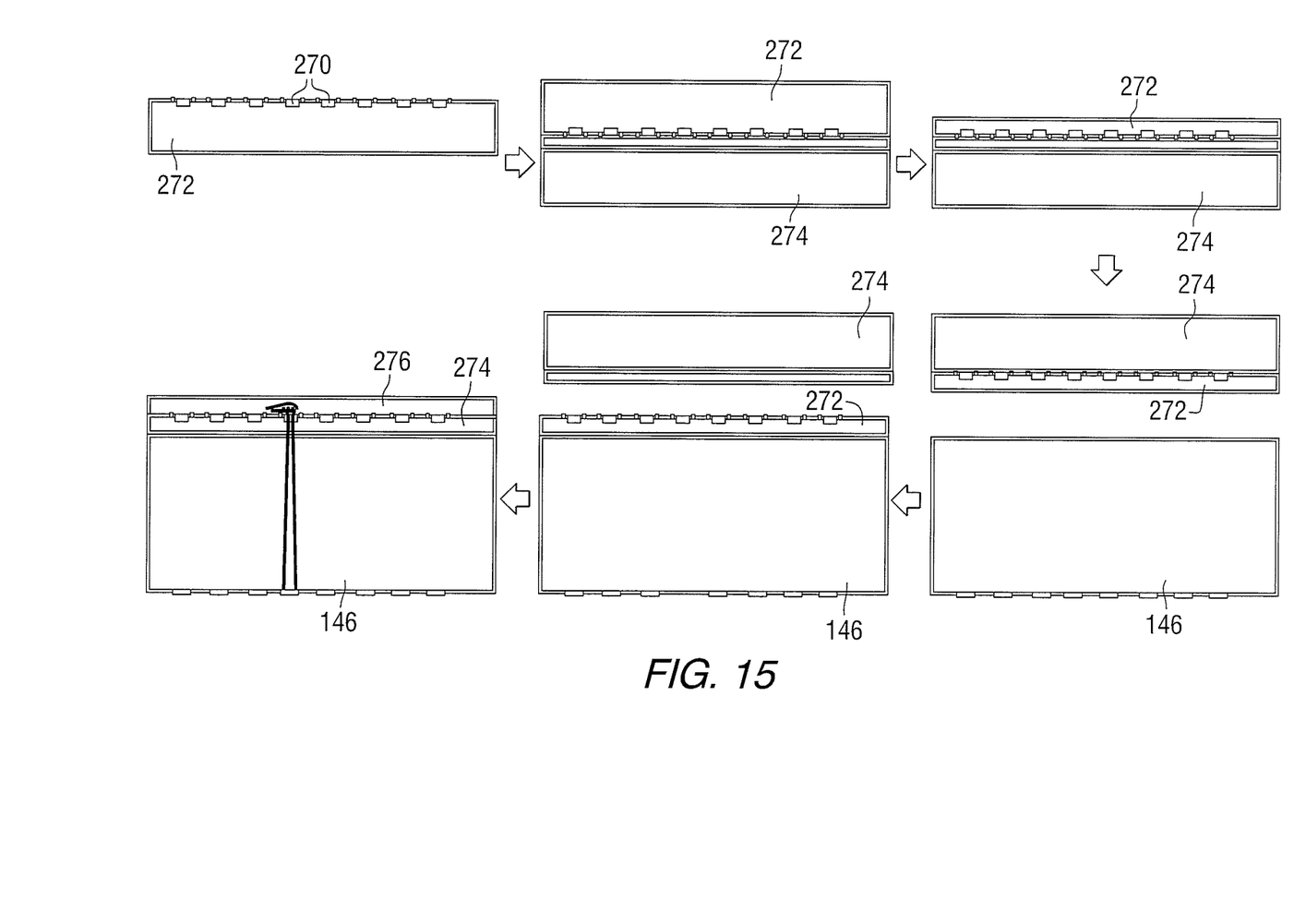
FIG. 15 is a schematic representation of a fabrication process used to make laser diodes.

In addition to the various types of bonding shown in FIGS. 13 and 14, the transfer of the laser wafer could utilize a temporary bonding process. In this approach, a source substrate (in this case the GaAs laser wafer) is temporarily bonded to a carrier substrate with the "top" face down towards the carrier substrate. This allows wafer thinning and/or die singulation prior to transfer. The source wafer is then permanently bonded to the transparent extended cavity substrate. Finally, the carrier substrate is removed by a method depending on the temporary bonding layer (thermal reflow, UV exposure, mechanical detachment, wet or dry chemical etching/dissolving of bonding layer, etc.). This process is illustrated in FIG. 15.

First laser active regions 270 are fabricated on a full thickness wafer 272. Then the wafer 272 is bonded face down to a carrier wafer 274 using a temporary bonding material. The laser wafer is then thinned to a desired thickness and permanently bonded to the transparent substrate 146 using one of the previously described bonding methods. Next the carrier wafer is released using an appropriate method such as sacrificial bonding layer (e.g., ultraviolet, thermal bake, etc.). Then a wafer 276 having the head magnetics is bonded to the laser wafer. This process can also be applied to the batch patterned transfer method shown in FIG. 8.

As described above, in one aspect, the invention provides an apparatus including a storage medium, a recording head, and an arm for positioning the recording head adjacent to the storage medium, wherein the recording head includes a transducer assembly including a waveguide and a grating structured to couple electromagnetic radiation into the waveguide; and a body including an air bearing surface and an extended cavity vertical cavity surface emitting laser diode, wherein the transducer assembly is positioned adjacent to the body and the laser diode directs electromagnetic radiation onto the grating.

In another aspect, the invention provides a method including: forming a plurality of vertical cavity surface emitting laser diode active regions on a first surface of a transparent substrate, forming a plurality of mirrors on a second surface of the substrate, wherein each of the mirrors is aligned with one of the vertical cavity surface emitting laser diode active regions to form an extended cavity therebetween, fabricating a plurality of transducer portions on the substrate to form a plurality of recording heads, and separating the recording heads.

In another aspect, the invention provides a method including: forming a plurality of vertical cavity surface emitting laser diode active regions on a first surface of a transparent substrate, forming a plurality of mirrors on a second surface of the substrate, wherein each of the mirrors is aligned with one of the vertical cavity surface emitting laser diode active regions to form an extended cavity therebetween, bonding a plurality of transducer portions to the vertical cavity surface emitting laser diode active regions to form a plurality of recording heads, and separating the recording heads.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular type of laser used, while maintaining substantially the same functionality without departing from the scope and spirit of the present invention.

The implementations described above and other implementations are within the scope of the following claims.

What is claimed is:

1. An apparatus comprising:
   a transducer assembly including a waveguide and a grating structured to couple electromagnetic radiation into the waveguide; and
   an extended cavity vertical cavity surface emitting laser diode forming a slider body that comprises an air bearing surface, wherein the transducer assembly is positioned adjacent to a first end of the slider body and the laser diode directs electromagnetic radiation onto the grating.

2. The apparatus of claim 1, wherein the laser diode includes one of GaAs or InGaP active elements coupled to an external cavity comprising one of silicon, glass, sapphire, or SiC.

3. The apparatus of claim 1, wherein the transducer assembly and the laser diode are bonded together using one of: solder, frit, epoxy, metal-metal diffusion bonding, direct bonding, or plasma enhanced direct bonding.

4. The apparatus of claim 1, wherein the grating comprises an angled blazed grating.

5. The apparatus of claim 1, wherein the laser diode comprises:
   an active element proximate the first end;
   a mirror proximate a second end that is opposed to the first end of the slider body; and
   a transparent section that extends between the active element and the mirror.

6. An apparatus comprising:
   a storage medium;
   a recording head; and
   an arm for positioning the recording head adjacent to the storage medium;
   wherein the recording head includes a transducer assembly including a waveguide and a grating structured to couple electromagnetic radiation into the waveguide; and an extended cavity vertical cavity surface emitting laser diode forming a slider body that comprises an air bearing surface, wherein the transducer assembly is positioned adjacent to a first end of the slider body and the laser diode directs electromagnetic radiation onto the grating.

7. The apparatus of claim 6, wherein the laser diode includes one of GaAs or InGaP active elements coupled to an external cavity comprising one of silicon, glass, sapphire, or SiC.

8. The apparatus of claim 6, wherein the transducer assembly and the laser diode are bonded together using one of: solder, frit, epoxy, metal-metal diffusion bonding, direct bonding, or plasma enhanced direct bonding.

9. The apparatus of claim 6, wherein the grating comprises an angled blazed grating.

10. The apparatus of claim 6, wherein the laser diode comprises:
    an active element proximate the first end;
    a mirror proximate a second end that is opposed to the first end of the slider body; and
    a transparent section that extends between the active element and the mirror.

11. A method comprising:
    forming a plurality of vertical cavity surface emitting laser diode active regions on a first surface of a transparent substrate;
    forming a plurality of mirrors on a second surface of the substrate, wherein each of the mirrors is aligned with one of the vertical cavity surface emitting laser diode active regions to form an extended cavity and slider body there between;
    fabricating a plurality of transducer portions on the substrate to form a plurality of recording heads; and
    separating the recording heads.

12. The method of claim 11, wherein the step of forming a plurality of vertical cavity surface emitting laser diode active regions on a first surface of a transparent substrate comprises:
    forming the plurality of vertical cavity surface emitting laser diode active regions on a transfer substrate; and
    transferring the plurality of vertical cavity surface emitting laser diode active regions to the first surface of the transparent substrate.

13. The method of claim 11, wherein the step of forming a plurality of vertical cavity surface emitting laser diode active regions on a first surface of a transparent substrate comprises:
    forming the plurality of vertical cavity surface emitting laser diode active regions in a wafer; and
    bonding the wafer to the transparent substrate.

14. The method of claim 11, wherein the step of forming a plurality of mirrors on a second surface of the substrate comprises:
    depositing a transparent mold layer on the second surface of the substrate;
    depositing a resist layer on the mold layer;
    patterning the resist layer to form resist islands;
    etching the mold layer to form curved surfaces; and
    depositing a mirror layer on the curved surfaces.

15. The method of claim 11, wherein the step of forming a plurality of mirrors on a second surface of the substrate comprises:
    depositing a resist layer on the second surface of the substrate;
    patterning the resist layer to form resist islands;
    etching the second surface to form curved surfaces; and
    depositing a mirror layer on the curved surfaces.

16. The method of claim 11, further comprising:
    forming alignment marks on the first and second surfaces of the substrate.

17. A method comprising:
    forming a plurality of vertical cavity surface emitting laser diode active regions on a first surface of a transparent substrate;
    forming a plurality of mirrors on a second surface of the substrate, wherein each of the mirrors is aligned with one of the vertical cavity surface emitting laser diode active regions to form an extended cavity and slider body there between;

bonding a plurality of transducer portions to the vertical cavity surface emitting laser diode active regions to form a plurality of recording heads; and separating the recording heads.

18. The method of claim 17, wherein the step of bonding the wafer to the vertical cavity surface emitting laser diode active regions uses a patterned layer of bonding material.

19. The method of claim 17, wherein the step of bonding the wafer to the vertical cavity surface emitting laser diode active regions uses a continuous layer of bonding material.

20. The method of claim 17, wherein the transducer portions and the vertical cavity surface emitting laser diode active regions are bonded together using one of:

solder, frit, epoxy, metal-metal diffusion bonding, direct bonding, or plasma enhanced direct bonding.

* * * * *